United States Patent [19]

Bayles

[11] 4,291,683

[45] Sep. 29, 1981

[54] SOLAR PANEL

[76] Inventor: Bruce R. Bayles, 1921 Riverview St., Eugene, Oreg. 97403

[21] Appl. No.: 45,099

[22] Filed: Jun. 4, 1979

Related U.S. Application Data

[63] Continuation-in-part of Ser. No. 833,017, Sep. 14, 1977, abandoned.

[51] Int. Cl.³ .......................... F24J 3/02; E04D 1/00
[52] U.S. Cl. .................................. 126/448; 126/450; 126/DIG. 2; 52/533
[58] Field of Search ............ 165/47, 53; 126/DIG. 2, 126/450, 443, 444, 448; 52/518, 519, 533, 534

[56] References Cited

U.S. PATENT DOCUMENTS

| | | | |
|---|---|---|---|
| 4,103,674 | 8/1978 | Robinson et al. | 126/450 |
| 4,108,155 | 8/1978 | Koizumi et al. | 126/450 |
| 4,111,188 | 9/1978 | Murphy | 126/446 |
| 4,144,874 | 3/1979 | Zebuhr | 126/DIG. 2 |
| 4,146,014 | 3/1979 | Allegro | 126/450 |
| 4,163,445 | 8/1979 | Stanger | 126/DIG. 2 |
| 4,210,122 | 7/1980 | Artweger | 126/450 |

FOREIGN PATENT DOCUMENTS

| | | |
|---|---|---|
| 2529095 | 1/1977 | Fed. Rep. of Germany 126/DIG. 2 |
| 2555015 | 6/1977 | Fed. Rep. of Germany 126/DIG. 2 |
| 2602814 | 8/1977 | Fed. Rep. of Germany 126/DIG. 2 |
| 2330974 | 11/1975 | France .......................... 126/DIG. 2 |

*Primary Examiner*—Daniel J. O'Connor
*Attorney, Agent, or Firm*—James D. Givnan, Jr.

[57] ABSTRACT

A solar panel including a base within which are mounted transversely extending conduits. A heat collector plate in the base is in heat conductive relationship with the conduits for the heating of a fluid medium. The base additionally supports a transparent cover outwardly spaced from the heat collector plate to provide a protective insulative air space over the plate. A manifold communicates one series of panels with those of an adjacent series. A modified base dispenses with a collector plate and is formed so as to define integral lengthwise extending passageways for the solar heated medium. Inserted nipples interconnect the passageways of adjacent panels.

4 Claims, 8 Drawing Figures

U.S. Patent  Sep. 29, 1981  Sheet 1 of 2  4,291,683
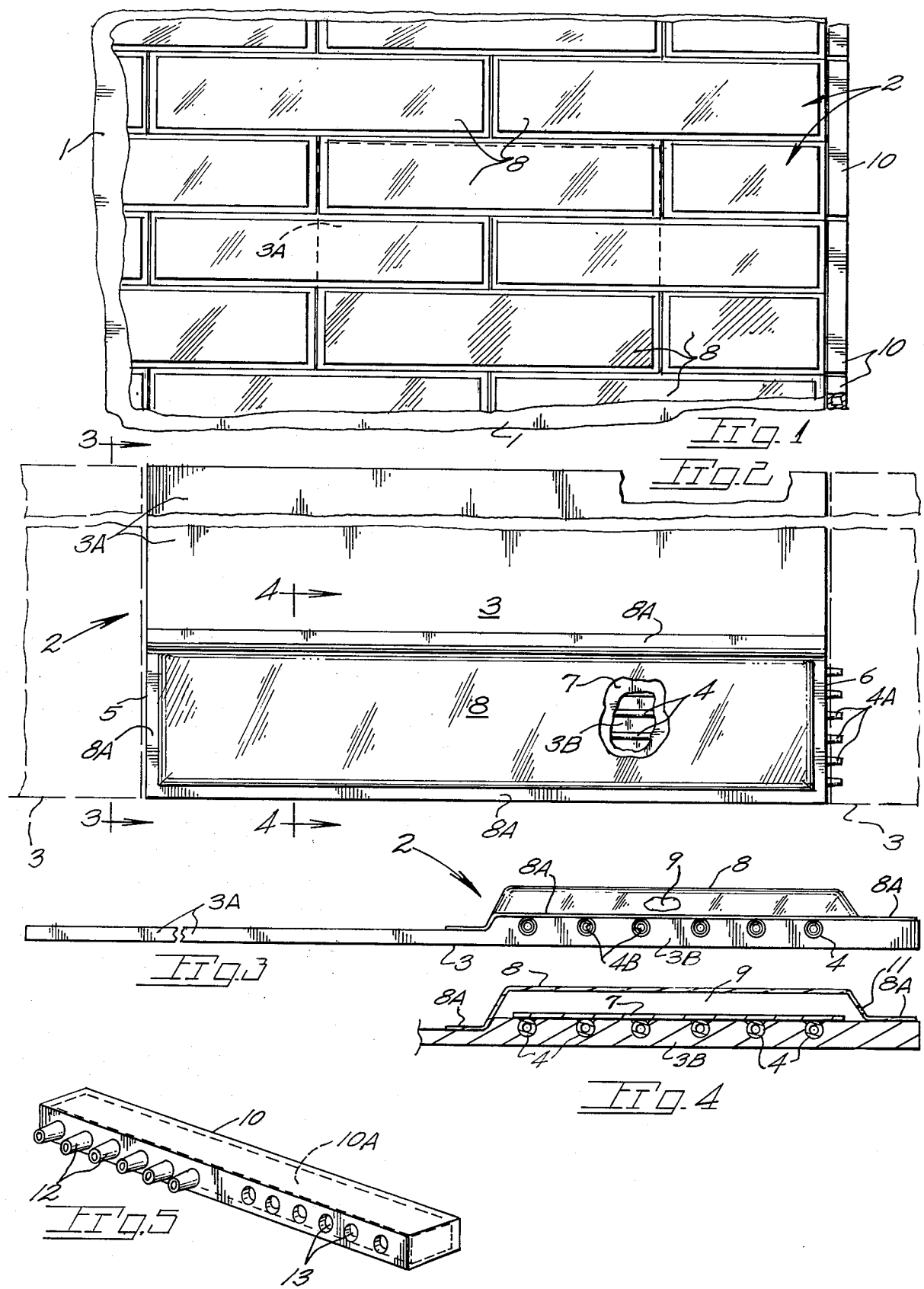

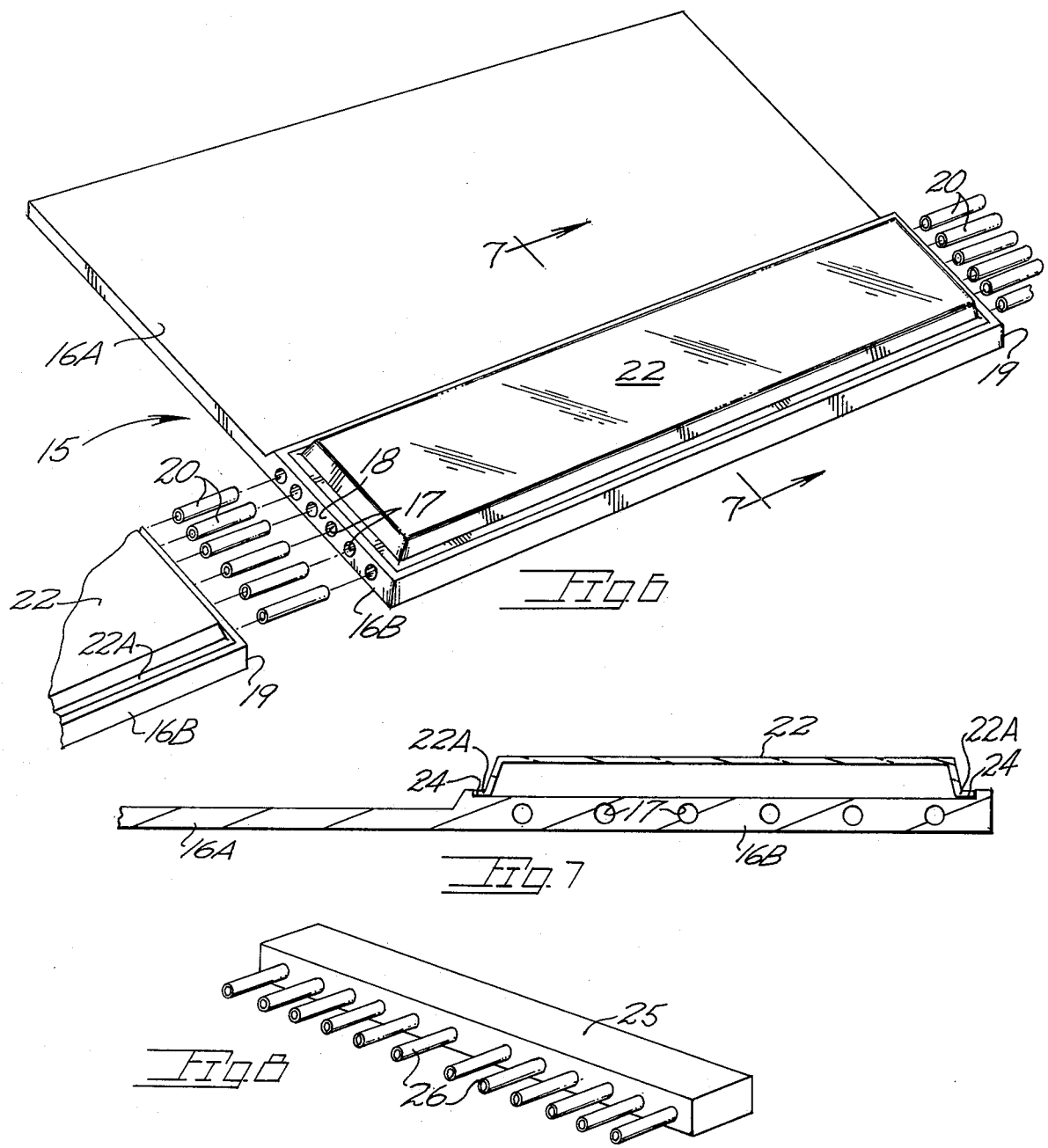

SOLAR PANEL

BACKGROUND OF THE INVENTION

The present application is a continuation-in-part of my copending U.S. patent application bearing the same title, filed Sept. 14, 1977, under Ser. No. 833,017, now abandoned.

The present invention relates generally to solar heating systems and more particularly to a solar panel for use in series on a supporting structure with each of said panels including passageways within a panel base.

Well known in the solar panel field are various types of panels, a number of which are free standing intended for use apart from a supporting roof or wall structure. Additionally, the prior art includes solar panels intended for supported placement on and within existing roof and wall structures. Common to both types of panels are conduit means providing a communicating heat flow through the panel series and ultimately to a storage receptacle from which a fluid flow is regulated by various thermostatic control and pump arrangements. The known panels are typically of considerable size and include rigid structural members resulting in substantial panel weight and, accordingly, panel installation entails substantial preparation or modification of the supporting structure. Accordingly, the modification of existing wall and roof structures to receive known solar panels is quite costly. Further, the prior art solar panels being of considerable size do not lend themselves to convenient, low cost shipping nor convenient handling at the installation site.

SUMMARY OF THE PRESENT INVENTION

The present invention is embodied within a solar panel adapted for wide use on an array of supporting structures without costly modification of the latter.

The solar panel includes a base which may be of an insulative type of material not unlike composition material widely used in asphalt shingle construction. Embodied within the base is a series of fluid filled conduits, each being in heat conductive association with a radiation collector in place on the base. A cover for said collector plate admits solar radition with said cover serving to minimize convection loss from said plate. Each of said panels is in fluid communication with adjacent panels while a manifold arrangement provides for fluid transfer from one panel to a subjacent panel at the end of a row of panels.

A modified panel dispenses with a collector plate and conduits per se and instead defines lengthwise extending openings or passageways formed therein through which a solar heated medium passes. Nipples communicate the passageways of adjacent panels.

Important objects of the present invention include the provision of a thermally efficient panel readily installable upon an existing or new structure without radical modification of the structure being required; the provision of a panel of an integral nature not requiring on-site assembly of panel components; the provision of a panel with conduit means for inserted engagement with conduit means of an adjacent panel; the provision of a panel of lightweight, durable construction; the provision of a manifold communicating the conduit means of vertically offset panels; and the provision of a solar panel which, when in place, is unobtrusive and preserves the aesthetic values of any structure on which the panel or panels may be supported and may function to constitute a roof covering for a home or building; the provision of a solar panel with a multi-thickness base for partially overlapped installation on a supporting structure with the thicker portion of the base defining lengthwise orientated low restrictive, multiple, fluid passageways; the provision of a solar panel dispensing with the costly fabrication of metal components and utilizing non-metalic heat conductive materials formed in a low cost manner with passageways therein through which a solar heated medium passes.

Additional objectives will become apparent upon a reading of the following description.

BRIEF DESCRIPTION OF THE DRAWING

In the accompanying drawing:

FIG. 1 is a front elevational view of a supporting structure on which the present panels are mounted;

FIG. 2 is an enlarged view of a panel embodying the present invention sectioned for purposes of illustration with fragments broken away to disclose internal details;

FIG. 3 is an end view of the panel taken along line 3—3 of FIG. 2 and rotated to the horizontal;

FIG. 4 is a vertical sectional view taken along line 4—4 of FIG. 3 showing panel details;

FIG. 5 is a perspective view of a manifold for communicating panel fluid flows;

FIG. 6 is a perspective view of a modified panel;

FIG. 7 is a vertical sectional view taken along line 7—7 of FIG. 6; and

FIG. 8 is a perspective view of a manifold for communicating the fluid passageways of end located panels.

DETAILED DESCRIPTION OF THE PRESENT INVENTION

With continuing attention to the drawing, the reference numeral 1 indicates a structural surface which may be a roof, subroofing or a wall structure on which the present panels are in row placement.

Indicated generally at 2 are the present panels each having a substantially planar base 3 which is of a monolithic nature and preferably having insulative qualities as later noted. An upper or first base portion at 3A is adapted for securement as by nailing to supporting surface 1. A lower and somewhat thicker second portion 3B of the base is of adequate thickness to retain later described conduit means in place, the conduits indicated at 4 and extending lengthwise of the base. Said conduits extend intermediate the opposite side edges 5 and 6 of the panel and permit the flow of a fluid medium thereacross. Base portion 3B of the panel additionally serves to insulate tubular members or conduits 4 to minimize heat loss from the transient fluid medium. The conduit, of course, may be other than of circular section.

In heat transferring relationship with conduits 4 is a metallic collector plate 7 having a black upper surface for optimum collection of solar radiation. Preferably, the conduits 4 and plate 7 are in physical contact with one another to enhance heat transfer therebetween. The conduits and plate may, if desired, be formed as an integral unit with the conduits being joined as by soldering or the like to the plate underside.

Projecting conduit ends 4A are adapted for fluid communicating engagement with internally flared conduit ends at 4B to provide communicating means between panels. Conduit ends 4B may be otherwise shaped to provide a fluid tight coupling with the projecting truncated conical ends 4A. To further assure fluid communication between panels without fluid loss, the abutting edge surfaces or extremities 5 and 6 of adjacent panels may be treated with a suitable sealant prior to panel abutment with one another in a series or row of panels.

A transparent, raised cover at 8 defines, along with base portion 3B and collector 7 plate, an air space 9 while protecting plate 7 from the elements. Said cover also serves to provide a convection barrier to restrict heat loss from plate 7. Cover marginal areas at 8A are suitably secured to underlying marginal areas of base portion 3B to provide a closed air space. Such securement may be by a suitable adhesive bonding or fusing depending on base and cover materials. Cover 8 may be of a transparent, synthetic material or tempered glass with the objectives being the transmission of radiant energy and the minimizing of heat loss by convection from plate 7. If desired, cover 8 may be provided with vent opening as at 11 adjacent its lowermost edge to prevent damage from internal pressure fluctuations.

Indicated at 10 is a fluid manifold intended for communicating the conduits of superjacent-subjacent panels at the ends of the panel rows. The manifold serves to receive solar heated fluid from conduits 4 of one panel and conveys the flow to the conduit ends of a subjacent panel. A serpentine flow is thus provided for through successive rows of panels. Fluid is communicated to an internal chamber 10A via projections 12 and openings 13 tapered to fit the corresponding conduit ends.

In use the panels may be installed on a supporting surface in a shingle-like staggered row manner with partially overlapped surfaces. The panel when so installed may additionally serve as a roof covering in the manner of a shingle. Alternatively, the panel may be of a length to extend entirely across a supporting surface. When installed as a roof covering, certain panels will be of a lesser length to provide an aligned outer roof edge as shown at the right hand side of FIG. 1.

Base 3B of the panel may be of asphaltic construction, not unlike present shingle construction, but shown as being of greater thickness than a shingle.

The present panel is intended to receive a passing fluid medium which is heated during panel passage and thereafter routed according to the use desired which may include heat exchangers, storage tanks, heat radiating coils, etc., with fluid flow controlled by well known components associated with existing solar heating systems.

FIGS. 6 and 7 disclose a modified solar panel dispensing with embedded conduits and instead formed so as to define passageways extending lengthwise in the panel.

The modified panel at 15 includes a first or upper base portion 16A for securement to an underlying support as by nailing. A second or lower base portion 16B is thicker and defines lengthwise extending, medium carrying conduit means 17 coterminous with base side edges or extremities 18 and 19.

Formation of the monolithic panel base may be from a material, such as a suitable elastomer or polymer, capable of withstanding temperatures encountered by exposure to the sun's rays and of the type having good heat conductance. The solar collector above described in the first description of the invention may be dispensed with in the modified panel.

Communication between passageways 17 of adjacent panels may be by nipple or communicating means at 20 adapted for inserted fluid tight engagement with the passageways.

A transparent cover at 22 defines an air space of the modified panel and may be affixed to the base as earlier noted. Alternatively, the transparent cover may be provided with flanged or marginal areas 22A for insetting and securing by suitable means within recessed marginal areas 24 of panel lower base portion 16B.

A manifold at 25 with insertable projections 26 serves to communicate the passageways 17 of one end panel of a series with those passageways of a panel of a subjacent series to provide a reverse medium flow back through the subjacent panels all being in place on a supporting structure.

While I have shown but a few embodiments of the invention, it will be apparent to those skilled in the art that the invention will be embodied still otherwise without departing from the spirit and scope of the invention.

Having thus described the invention, what is claimed and desired to be secured under a Letters Patent is:

1. A solar panel for securement to a roof surface in rows for converting solar radiation to thermal energy, said panel comprising in combination, a planar base constructed of monolithic elastomeric material having a first portion adapted to be secured to and overlie an underlying supporting surface and be overlapped by a like solar panel, a base second portion integral with and of greater thickness than said first portion and adapted to partially overlie the first portion of an adjacent panel, said second base portion defining multiple conduit passageways open at their ends and extending lengthwise of said second base portion, communicating means at the panel extremities and communicating the passageways of the solar panel with those of an adjacent solar panel, said communicating means including surfaces for the insertion of nipples to join adjacent panels and a transparent cover on said second portion of said base and defining an air space, said cover constituting a barrier to minimize convection losses from said second portion wherein said transparent cover has marginal areas inset within said second portion of the panel base and is not overlapped by said second base portion.

2. The solar panel claimed in claim 1 wherein said base is of a monolithic nature.

3. A solar panel through which a fluid medium may flow for securement to a surface in rows for converting solar radiation to thermal energy, said panel comprising in combination, a planar base constructed of monolithic elastomeric material of a homogeneous nature having a first portion of planar configuration adapted to be secured to an underlying supporting surface and overlapped by a like solar panel, a base second portion of greater thickness than said first portion and adapted to partially overlie the first portion of an adjacent panel, multiple open ended conduit means in said second base portion and terminating at opposite panel extremities and adapted to conduct fluid medium flow between said extremities, communicating means at the panel extremities and communicating the flow from the conduit means of one panel to the conduit means of an adjacent panel, said communicating means including surfaces for the insertion of nipples to join adjacent panels and a transparent cover on said second portion of said base and partially defining an air space, said cover constituting a barrier to minimize convection losses from said second base portion wherein said transparent cover has marginal areas inset within said second portion of the panel base and is not overlapped by said second base portion.

4. The panel claimed in claim 3 wherein said multiple open ended conduit means in each panel are in mutually spaced parallel relationship with one another.

* * * * *